(12) United States Patent
Ein-Dor et al.

(10) Patent No.: US 12,423,528 B2
(45) Date of Patent: Sep. 23, 2025

(54) GENERATING SENTIMENT MODELS USING WEAK LABELS GENERATED FROM DISCOURSE MARKERS

(71) Applicant: International Business Machines Corporation, Armonk, NY (US)

(72) Inventors: Liat Ein-Dor, Tel Aviv (IL); Ilya Shnayderman, Jerusalem (IL); Artem Spector, Rishon Le-Zion (IL); Lena Dankin, Tel Aviv (IL); Ranit Aharonov, Ramat Hasharon (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 18/057,536

(22) Filed: Nov. 21, 2022

(65) Prior Publication Data
US 2024/0169160 A1    May 23, 2024

(51) Int. Cl.
G06F 40/40      (2020.01)
G06F 40/205     (2020.01)
G06F 40/295     (2020.01)

(52) U.S. Cl.
CPC ............ *G06F 40/40* (2020.01); *G06F 40/205* (2020.01); *G06F 40/295* (2020.01)

(58) Field of Classification Search
USPC .............................................. 704/7–10, 257
See application file for complete search history.

(56) References Cited

U.S. PATENT DOCUMENTS

| | | | |
|---|---|---|---|
| 11,556,722 B1* | 1/2023 | Ben Shahar | G06F 40/51 |
| 11,734,937 B1* | 8/2023 | Pushkin | G06F 18/2155 706/12 |
| 2014/0108006 A1* | 4/2014 | Vogel | G06F 40/40 704/9 |
| 2015/0339288 A1* | 11/2015 | Baker | G06F 40/166 704/9 |
| 2017/0161372 A1* | 6/2017 | Fernández | G06F 40/211 |
| 2018/0189691 A1 | 7/2018 | Oehrle et al. | |

(Continued)

FOREIGN PATENT DOCUMENTS

CN          113705238 A       11/2021

OTHER PUBLICATIONS

Jan Kocon et al., "AspectEmo: Multi-Domain Corpus of Consumer Reviews for Aspect-Based Sentiment Analysis", 2021 International Conference on Data Mining Workshops (ICDMW), Jan. 20, 2022, 8 pages.

(Continued)

*Primary Examiner* — Leonard Saint-Cyr
(74) *Attorney, Agent, or Firm* — Michael A. Petrocelli (57) ABSTRACT

An example system includes a processor to receive a list of sentiment carrying discourse markers. The processor is to select sentences in a text corpus that begin with a discourse marker from the list of sentiment carrying discourse markers followed by a comma. The processor is to remove each discourse marker and comma from a beginning of the selected sentences and labeling each of the sentences with a sentiment associated with to a corresponding removed discourse marker to generate a weakly labeled dataset. The processor is to inter-train a pretrained language model using the generated weakly labeled dataset to generate a sentiment model.

19 Claims, 7 Drawing Sheets

(56) References Cited

U.S. PATENT DOCUMENTS

2020/0279075 A1* 9/2020 Avedissian ............. G06N 20/00
2021/0150140 A1 5/2021 Galitsky
2022/0406292 A1* 12/2022 Bratt ..................... G06F 40/117

OTHER PUBLICATIONS

Liat Ein-Dor et al., "Fortunately, Discourse Markers Can Enhance Language Models for Sentiment Analysis", IBM, Apr. 5, 2022, 10 pages.

Deriu et al. "Leveraging Large Amounts of Weakly Supervised Data for Multi-Language Sentiment Classification", WWWW'17: Proceedings of the 26th International Conference on World Wide Web, Apr. 3, 2017, pp. 1045-1052.

Ke et al. "SentiLARE: Sentiment-Aware Language Representation Learning with Linguistic Knowledge" arXiv: 1911.02493v3 [cs.CL], Sep. 24, 2020, 14 pages.

Mukherjee et al. "Sentiment Analysis in Twitter with Lightweight Discourse Analysis", COLING 2012, 24th International Conference on Computational Linguistics, Proceedings of the Conference: Technical Papers, Dec. 8-15, 2012, 18 pages.

Severyn et al. "UNITN: Training Deep Convolutional Neural Network for Twitter Sentiment Classification", ACL Anthology, Jun. 2015, pp. 464-469.

Sileo et al. "Mining Discourse Markers for Unsupervised Sentence Representation Learning", Proceedings of NAACL-HLT, Jun. 2019, 10 pages.

Yin et al. "SentiBERT: A Transferable Transformer-Based Architecture for Compositional Sentiment Semantics", arXiv:2005.04114v4 [cs.CL], May 21, 2020, 12 pages.

Zhou et al. "SentiX: A Sentiment-Aware Pre-Trained Model for Cross-Domain Sentiment Analysis", ACL Anthology, Dec. 2020, 12 pages.

* cited by examiner

GENERATING SENTIMENT MODELS USING WEAK LABELS GENERATED FROM DISCOURSE MARKERS

BACKGROUND

The present techniques relate to sentiment classification. More specifically, the techniques relate to training language models for sentiment classification.

SUMMARY

According to an embodiment described herein, a system can include processor to receive a list of sentiment carrying discourse markers. The processor can also further select sentences in a text corpus that begin with a discourse marker from the list of sentiment carrying discourse markers followed by a comma. The processor can also remove each discourse marker and comma from a beginning of the selected sentences, and label each of the sentences with a sentiment associated with a corresponding removed discourse marker to generate a weakly labeled dataset. The processor can then inter-train a pretrained language model using the generated weakly labeled dataset to generate a sentiment model.

According to another embodiment described herein, a method can include receiving, via a processor, a list of sentiment carrying discourse markers. The method can further include selecting, via the processor, sentences in a text corpus that begin with a discourse marker from the list of sentiment carrying discourse markers followed by a comma. The method can also further include removing, via the processor, each discourse marker and comma from a beginning of the selected sentences and labeling each of the sentences with a sentiment associated with to a corresponding removed discourse marker to generate a weakly labeled dataset. The method can also include inter-training, via the processor, a pretrained language model using the generated weakly labeled dataset to generate a sentiment model.

According to another embodiment described herein, a computer program product for generating language models can include computer-readable storage medium having program code embodied therewith. The program code executable by a processor to cause the processor to receive a list of sentiment carrying discourse markers. The program code can also cause the processor to select sentences in a text corpus that begin with a discourse marker from the list of sentiment carrying discourse markers followed by a comma. The program code can also cause the processor to remove each discourse marker and comma from a beginning of the selected sentences and labeling each of the sentences with a sentiment associated with to a corresponding removed discourse marker to generate a weakly labeled data. The program code can also cause the processor to inter-train a pretrained language model using the generated weakly labeled data to generate a sentiment model.

DETAILED DESCRIPTION

Pretrained language models are used in the natural language processing (NLP) to achieve state-of-the-art performance in various downstream tasks. However, in many cases, these models may not perform well when labeled data is scarce and the model is expected to perform in a zero or few-shot setting. Continual pretraining or performing a second phase of pretraining, referred to herein as inter-training, which is better aligned with the downstream task, can lead to improved results especially in the scarce data setting.

According to embodiments of the present disclosure, techniques described include generating large-scale weakly-labeled data in order to leverage sentiment-carrying discourse markers. As used herein, weakly labeled data refers to data that is labeled with some noise, or incorrect percentage of labeling. The weakly-labeled data is used to inter-train pretrained language models in order to adapt them to the task of sentiment classification. The techniques further include a method of creating a discourse marker-based general sentiment-aware pretrained language model (SenDM) and method of adapting a sentiment model for a specific domain. Thus, embodiments of the present disclosure enabled automated generation of weak labels for unsupervised training models for sentiment classification. Moreover, extensive experimental results showed improvement on various benchmark datasets. In particular, using the techniques described herein, a language model with fewer layers was able to significantly outperform pretrained language models trained using more layers across various numbers of training examples, particularly at smaller numbers of training examples. For example, a sentiment-aware model with only two layers trained using the techniques described herein was able to outperform a BERT model using 12 layers at various numbers of training examples.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
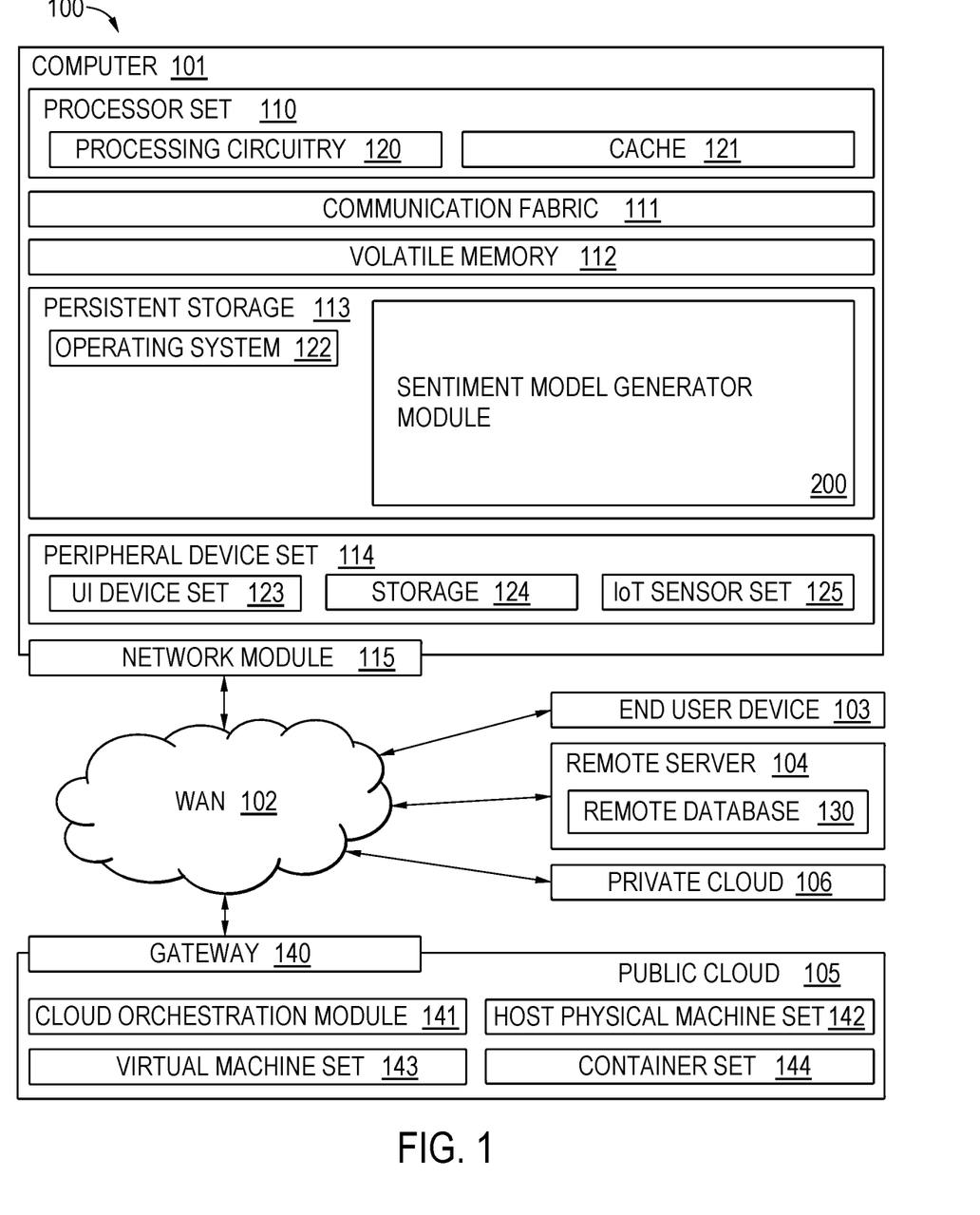
FIG. 1 is a block diagram of an example computing environment that contains an example of an environment for the execution of at least some of the computer code involved in performing the inventive methods, such as sentiment model generation.

Computing environment 100 contains an example of an environment for the execution of at least some of the computer code involved in performing the inventive methods, such as sentiment model generator module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
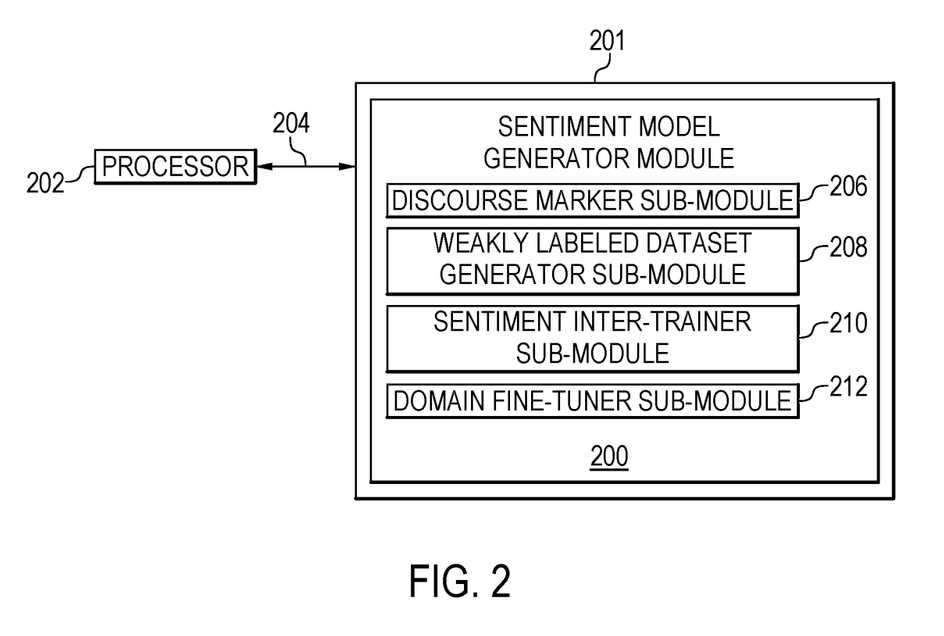
FIG. 2 is an example tangible, non-transitory computer-readable medium that can train sentiment-aware language models using labels generated from discourse markers.

Referring now to FIG. 2, a block diagram is depicted of an example tangible, non-transitory computer-readable medium 201 that can train sentiment-aware language models using labels generated from discourse markers. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 400 and 500 of FIGS. 4 and 5.

The various software components discussed herein may be stored on the tangible, non-transitory, computer-readable medium 201, as indicated in FIG. 2. For example, the sentiment model generator module 200 may include a discourse marker sub-module 206 that includes code to receive a list of sentiment carrying discourse markers. The discourse marker sub-module module 206 also includes code to select sentences in a text corpus that begin with a discourse marker from the list of sentiment carrying discourse markers followed by a comma. In some examples, the module 206 includes code to. In some examples, the module 206 includes code to. The sentiment model generator module 200 may further include a weakly labeled dataset generator sub-module 208 that includes code to remove each discourse marker and comma from a beginning of the selected sentences, and label each of the sentences with a sentiment associated with a corresponding removed discourse marker to generate a weakly labeled dataset. The sentiment model generator module 200 may also further include a sentiment inter-trainer sub-module 210 that includes code to inter-train a pretrained language model using the generated weakly labeled dataset to generate a sentiment model. The sentiment model generator module 200 may also further include a domain fine-tuner sub-module 212 that includes code to fine-tune the sentiment model using a domain-specific weakly labeled training dataset. For example, the domain fine-tuner sub-module 212 that includes code to automatically generate a domain-specific list of discourse markers using a domain-specific corpus and the sentiment model. The domain fine-tuner sub-module 212 includes code to extract sentence-opening n-grams followed by a comma from the domain-specific corpus. The domain fine-tuner sub-module 212 includes code to group together discourse marker candidates using named entity recognition (NER).

The domain fine-tuner sub-module 212 includes code to randomly sample sentences associated with a set of most frequently detected discourse marker candidates in the domain-specific corpus and running inference on the sentiment model to identify discourse markers associated with confident predictions in any of a number of sentiment classes. The domain fine-tuner sub-module 212 includes code to generate a domain-specific weakly labeled training dataset based on an automatically generated list of domain-specific discourse markers. The domain fine-tuner sub-module 212 includes code to fine-tune the sentiment model based on the domain-specific weakly labeled training dataset.

Figure 3:
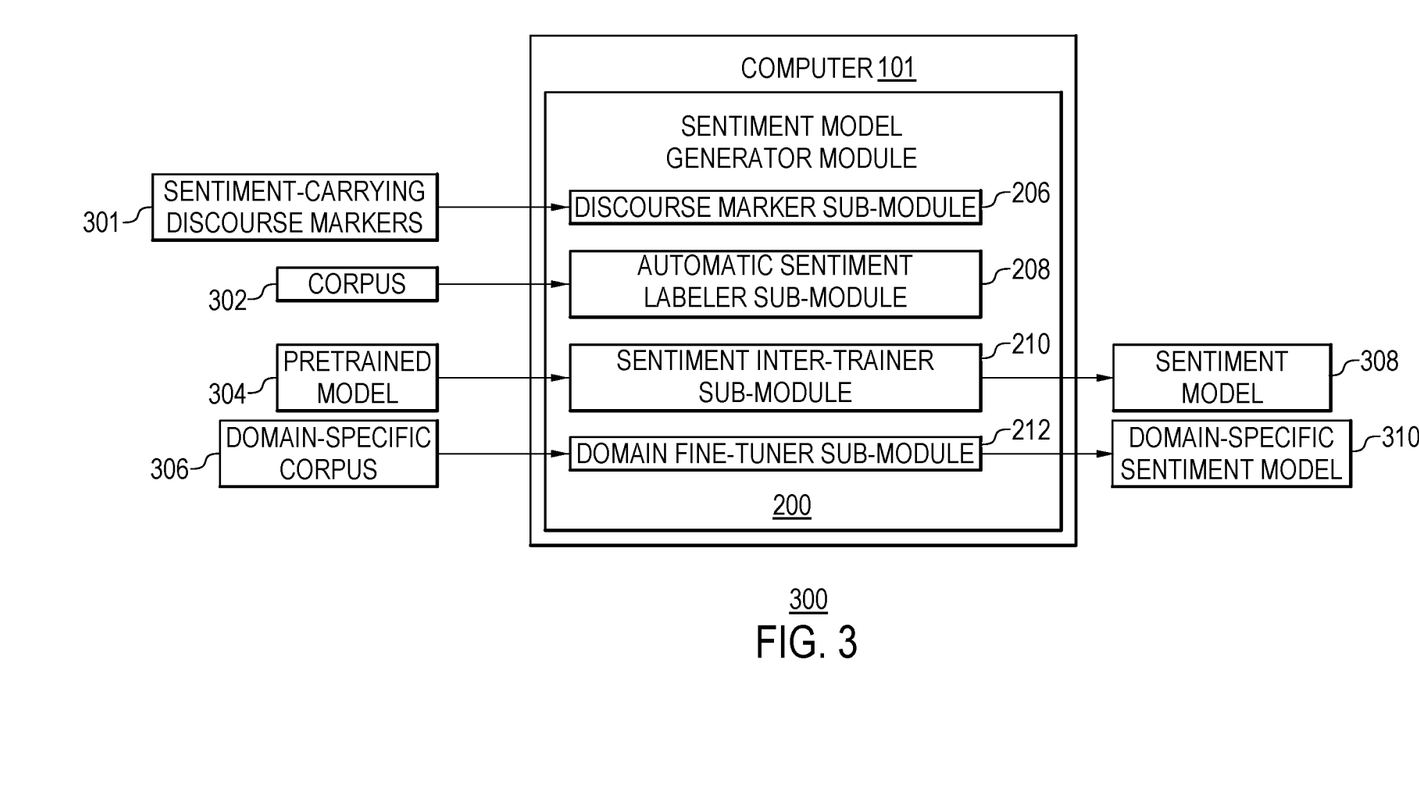
FIG. 3 is a block diagram of an example system for training sentiment-aware language models and domain-specific sentiment models using labels generated from discourse markers.

With reference now to FIG. 3, a block diagram shows an example system for training sentiment-aware language models and domain-specific sentiment models using labels generated from discourse markers. The example system 300 of FIG. 3 includes a similarly referenced elements from FIGS. 1 and 2. In addition, the system 300 includes sentiment-carrying discourse markers 301. For example, the sentiment-carrying discourse markers 301 may include a list of manually selected discourse markers that are selected for any number of sentiment classes. The system 300 also further includes a corpus 302. For example, the corpus may include sentences with prefixes. The system 300 includes a pretrained model 304. For example, the pretrained model may be based on the BERT model. The system 300 also further includes a domain-specific corpus. For example, the domain-specific corpus may include sentences having prefixes in any particular subject domain. The system 300 also includes a sentiment model 308. For example, the sentiment model 308 may be trained on training data generated from the corpus 302. The system 300 further includes a domain-specific sentiment model 310. For example, the domain-specific sentiment model 310 may have been fine-tuned on domain-specific training data automatically generated from the domain-specific corpus 306.

In various examples, the discourse marker sub-module 206 can receive a list of sentiment carrying discourse markers. The discourse marker sub-module module 206 also includes code to select sentences in a text corpus that begin with a discourse marker from the list of sentiment carrying discourse markers followed by a comma. The sentiment model generator module 200 may further include a weakly labeled dataset generator sub-module 208 that includes code to remove each discourse marker and comma from a beginning of the selected sentences, and label each of the sentences with a sentiment associated with a corresponding removed discourse marker to generate a weakly labeled dataset. The sentiment model generator module 200 may also further include a sentiment inter-trainer sub-module 210 that includes code to inter-train a pretrained language model using the generated weakly labeled dataset to generate a sentiment model. For example, the generated sentiment model may be a general domain language model. The sentiment model generator module 200 may also further include a domain fine-tuner sub-module 212 that includes code to fine-tune the sentiment model using a domain-specific weakly labeled training dataset. For example, the domain fine-tuner sub-module 212 that includes code to automatically generate a domain-specific list of discourse markers using a domain-specific corpus and the sentiment model. The domain fine-tuner sub-module 212 includes code to extract sentence-opening n-grams followed by a comma from the domain-specific corpus. The domain fine-tuner sub-module 212 includes code to group together discourse marker candidates using named entity recognition (NER). For example, the domain fine-tuner sub-module 212 can replace entity names with entity types in prefixes of sentences from a domain-specific corpus to generate a list of domain-specific discourse marker candidates. In some examples, the domain fine-tuner sub-module 212 includes code to select a domain-specific list of positive and negative discourse markers based on domain-specific discourse marker candidates associated with randomly sampled sentences having higher and lower sentiment scores. The domain fine-tuner sub-module 212 includes code to randomly sample sentences associated with a set of most frequently detected discourse marker candidates in the domain-specific corpus and run inference on the sentiment model for sentences without the discourse marker prefixes to identify discourse markers associated with overrepresentation of confident predictions of the sentiment model in any of a number of sentiment classes. The domain fine-tuner sub-module 212 includes code to generate a domain-specific weakly labeled training dataset based on the automatically generated list of domain-specific discourse markers. For example, the domain fine-tuner sub-module 212 may include code to extract sentences with domain-specific weak labels using an automatically generated domain-specific list of discourse markers. In some examples, the domain fine-tuner sub-module 212 may include code to extract sentences with domain-specific discourse markers, and require that predictions of the sentiment model for the sentences after removing the domain-specific discourse markers are consistent with the predictions of the class associated with the discourse markers with scores exceeding a threshold and use the extracted sentences without the prefixes as weakly labeled domain-specific training data, where the weak labels are the classes associated with the discourse markers. For example, the domain fine-tuner sub-module 212 may calculate the sentiment scores using the sentiment model. The domain fine-tuner sub-module 212 includes code to fine-tune the sentiment model based on the domain-specific weakly labeled training dataset. Thus, the domain fine-tuner sub-module 212 can fine-tune the generated sentiment model to generate a domain-specific sentiment model based on weakly labeled domain-specific training data automatically generated using the sentiment model from a domain-specific corpus.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional computers, or additional corpuses or models, etc.).

Figure 4:
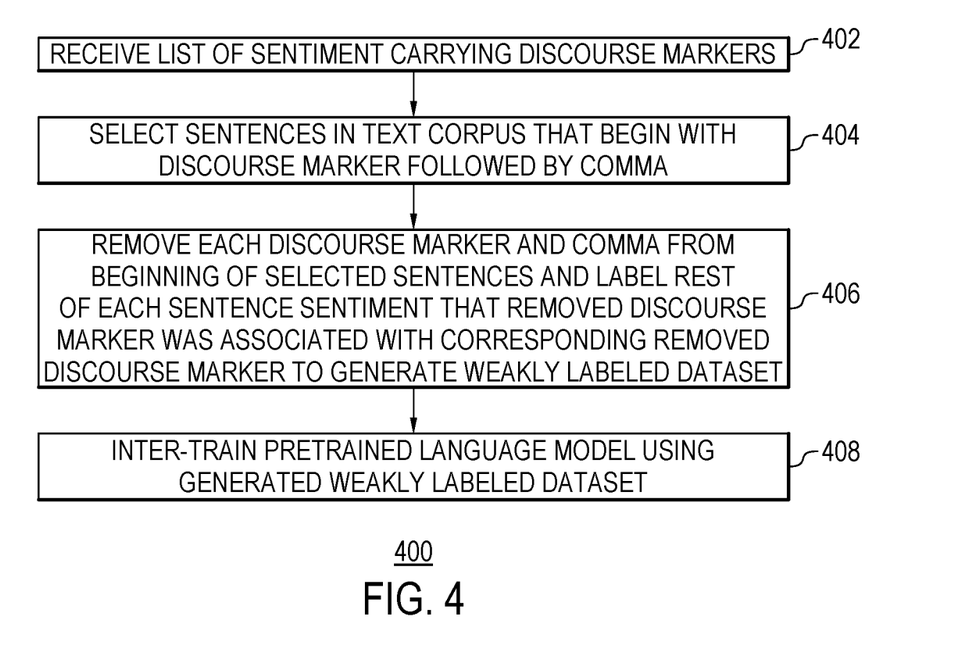
FIG. 4 is a process flow diagram of an example method that can inter-train pretrained language models using labels generated from discourse markers.

FIG. 4 is a process flow diagram of an example method that can inter-train pretrained language models using labels generated from discourse markers. The method 400 can be implemented with any suitable computing device, such as the computer 101 of FIG. 1. For example, the methods described below can be implemented by the processor set 110 of FIG. 1.

At block 402, a processor receives a list of sentiment carrying discourse markers. For example, the list of sentiment carrying discourse markers may have been selected manually from a list of potential discourse markers.

At block 404, the processor selects sentences in a text corpus that begin with a discourse marker from the list of sentiment carrying discourse markers followed by a comma.

At block 406, the processor removes each discourse marker and comma from a beginning of the selected sentences and labels each of the sentences with a sentiment associated with a corresponding removed discourse marker to generate a weakly labeled dataset.

At block 408, the processor inter-trains a pretrained language model using the generated weakly labeled dataset to generate a sentiment model. For example, the pretrained language model may be a BERT model. In some examples, the inter-training may be performed using any suitable machine learning training techniques, such as gradient descent, back propagation, and the use of the Adam optimizer.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may further include any of the operations of method 500 below.

Figure 5:
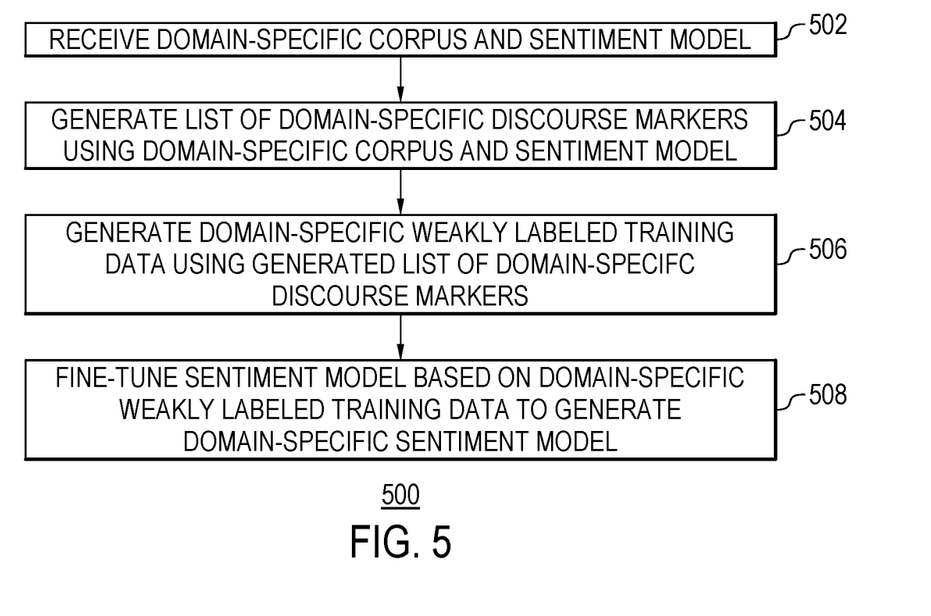
FIG. 5 is a process flow diagram of an example method that can fine-tune a sentiment model using domain-specific labels.

FIG. 5 is a process flow diagram of an example method that can fine-tune a sentiment model using domain-specific labels. The method 500 can be implemented with any suitable computing device, such as the computer 101 of FIG. 1. For example, the methods described below can be implemented by the processor set 110 of FIG. 1.

At block 502, a processor receives a domain-specific corpus and a sentiment model. For example, the sentiment model may have been inter-trained using the method 400 of FIG. 4.

At block 504, the processor automatically generates a domain-specific list of discourse markers using the domain-specific corpus and the sentiment model. The processor can identify a list of discourse marker candidates. For example, the processor can extract sentence-opening n-grams followed by a comma from the domain-specific corpus. For example, the n-grams may be unigrams, bigrams, or trigrams corresponding to prefixes of sentences. In various examples, the processor can group together discourse marker candidates using name entity recognition (NER). In some examples, the processor may thus generate a candidate discourse marker list, which may be a predetermined number of frequently detected discourse markers. For example, the list may be a list of 1000 most request discourse markers. In various examples, additional domain-specific filters may also be applied to the candidate discourse marker list. The processor can then select the domain-specific list of discourse markers from the list of candidate discourse markers by running inference on the sentiment model with sampled sentences corresponding to the list of candidate discourse markers, after removing the discourse marker and comma from the selected sentences. For example, the processor can randomly sample sentences associated with a set of most frequently detected discourse marker candidates in the domain-specific corpus and then run inference on the sentiment model for sentences without discourse marker prefixes to identify discourse markers associated with overrepresentation of confident predictions of the sentiment model in any of a number of sentiment classes. In various examples, the processor can use any suitable statistic test to find n-grams corresponding to sampled sentences associated with confident predictions for one of a number of sentiment classes. For example, the statistical test may be the Hypergeometric test.

At block 506, the processor generates domain-specific weakly labeled training data using the automatically generated list of domain-specific discourse markers. For example, the domain-specific weakly labeled training data may include a number of sentences with removed prefixes and commas, automatically labeled according to the sentiment of their corresponding removed prefix.

At block 508, the processor fine-tunes the sentiment model using the generated domain-specific weakly labeled training data to generate a domain-specific sentiment model. In some examples, the fine-tuning may be performed using any suitable machine learning training techniques, such as the Adam optimizer.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
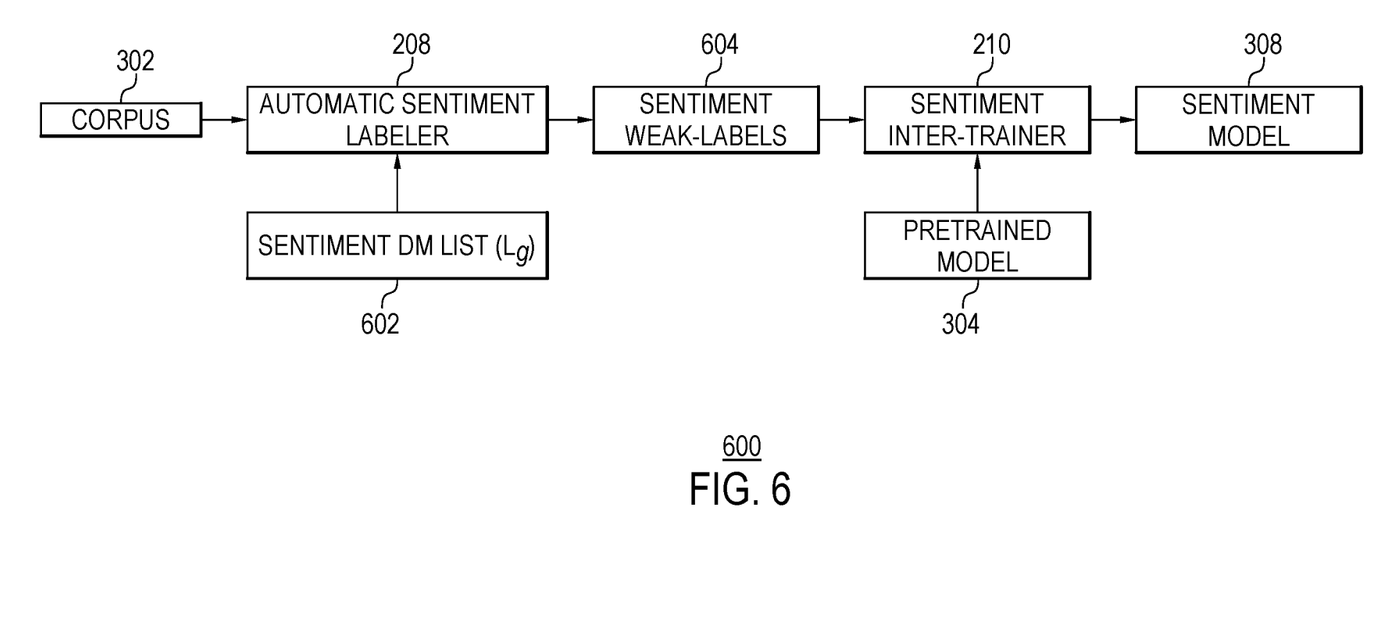
FIG. 6 is a block diagram of an example system for inter-training pretrained language models using weak labels generated from discourse markers.

With reference now to FIG. 6, a block diagram shows an example system for inter-training pretrained language models using weak labels generated from discourse markers. The example system is generally referred to by the reference number 600. FIG. 6 includes a corpus 302. For example, the corpus 302 may be any suitable corpus of unlabeled text. As one example, a corpus of some 400 million newspaper and journal articles may be used. For example, the articles may be broken into sentences, and these sentences indexed. In some examples, the system 600 may focus on English sentences. In various examples, the system 600 may use only sentences which are in the range of 3-32 tokens in length and have balanced parentheses. Otherwise, the sentence may be excluded from the inter-training.

In the example of FIG. 6, the system 600 may use a general approach to develop discourse marker-based sentiment models. In particular, the system 600 uses weakly labeled sentiment data set that is labeled using domain-specific weak labels 604, which is automatically derived from a given corpus 302 by leveraging strong associations between discourse markers and sentiment classes, as depicted in FIG. 6. Given a corpus 302 and a list L of sentiment discourse makers 602 that signal one of the sentiment classes, each accompanied by its class label, the system 600 can use any suitable heuristic to look for all sentences in C that start with l∈L followed by a comma. For example, the heuristic used may use criteria for selecting the discourse markers that can be dropped independently of the context without changing the interpretation of the discourse. As one example, the heuristic used may be of sentence opening n-grams, up to length 3, followed by comma. In various examples, the system 600 can then remove each discourse marker l and the comma from the beginning of each sentence, and annotate all resultant sentences with the class label associated with discourse marker l. In some examples, this process may result in a binary classification dataset for sentiment analysis, which the sentiment inter-trainer 210 may then use to inter-train a pretrained language model 304, M. In various examples, the system 600 can thus generate a new sentiment model 308, also referred to herein as a discourse marker based sentiment model (SenDM).

Still referring to FIG. 6, the generated SenDM may be a general sentiment model 308 that aims to improve the performance of sentiment classification across domains. SenDM is obtained using the flow described above in method 400 of FIG. 4. In particular, corpus 302 may be a general corpus 302 of newspaper and journal articles. The sentiment DM list 602 is a seed list of sentiment related discourse markers obtained manually using general knowledge of the English language. In various examples, any number of annotators may be asked to review a number of discourse markers and mark each as being positive or negative. For example, the annotators may review a list of the 173 commonly used discourse markers described in Sileo et al. (2019), and mark any discourse marker as positive or negative if the discourse marker is likely to open a sentence bearing a positive or a negative sentiment, respectively, based on its common usage in the English language. The final sentiment DM list 602 may include any number of discourse markers. For example, the sentiment DM list 602 may include 11 discourse markers selected by all of the annotators. As one specific example, the discourse markers identified as associated with a positive sentiment may include: "luckily", "hopefully", "fortunately", "ideally", "happily", and "thankfully", among any other suitable potential discourse markers. In various examples, the discourse markers in the sentiment DM list 602 associated with a negative sentiment may include: "sadly", "inevitably", "unfortunately", "admittedly", and "curiously", among any other suitable discourse markers. In some examples, the sentiment inter-trainer 210 may use the resulting weakly labeled data may to inter-train any suitable pretrained language model 304. As one example, the sentiment inter-trainer 210 can inter-train the uncased base or tiny architectures of a BERT model, resulting in models referred to herein as SenDM-base and SenDM-tiny, respectively.

As one detailed example of inter-training, the sentiment inter-trainer 210 may inter-train a BERT model using the generated weakly labeled data. For inter-training the SenDM model, a total of 1,876,614 weakly labeled sentences may first be obtained by using the list of sentiment related discourse markers, $L_g$ 602 over sentences in a general corpus of newspaper and journal articles Cg. The sentiment inter-trainer 210 can divide the samples into training (80%), development (10%), and test (10%) sets. The learning rate may be set to 5e-5, and the batch size to 32. The sentiment inter-trainer 210 may use an early stopping strategy, setting the max number of epochs to 4 and selecting the model with the best accuracy on the development set. The dropout probability may be always kept at 0:1. The sentiment inter-trainer 210 can employ an Adam optimizer with applied hyperparameters $\beta 1=0:9$, $\beta 2=0:999$, and $\epsilon=1e-06$. The sentiment inter-trainer 210 may be execute the training using two V100 graphics processing units (GPUs).

It is to be understood that the block diagram of FIG. 6 is not intended to indicate that the system 600 is to include all of the components shown in FIG. 6. Rather, the system 600 can include fewer or additional components not illustrated in FIG. 6 (e.g., additional client devices, or additional resource servers, etc.). For example, the system 600 may also include components to build an additional domain-adapted model as discussed in the example system 700 of FIG. 7.

Figure 7:
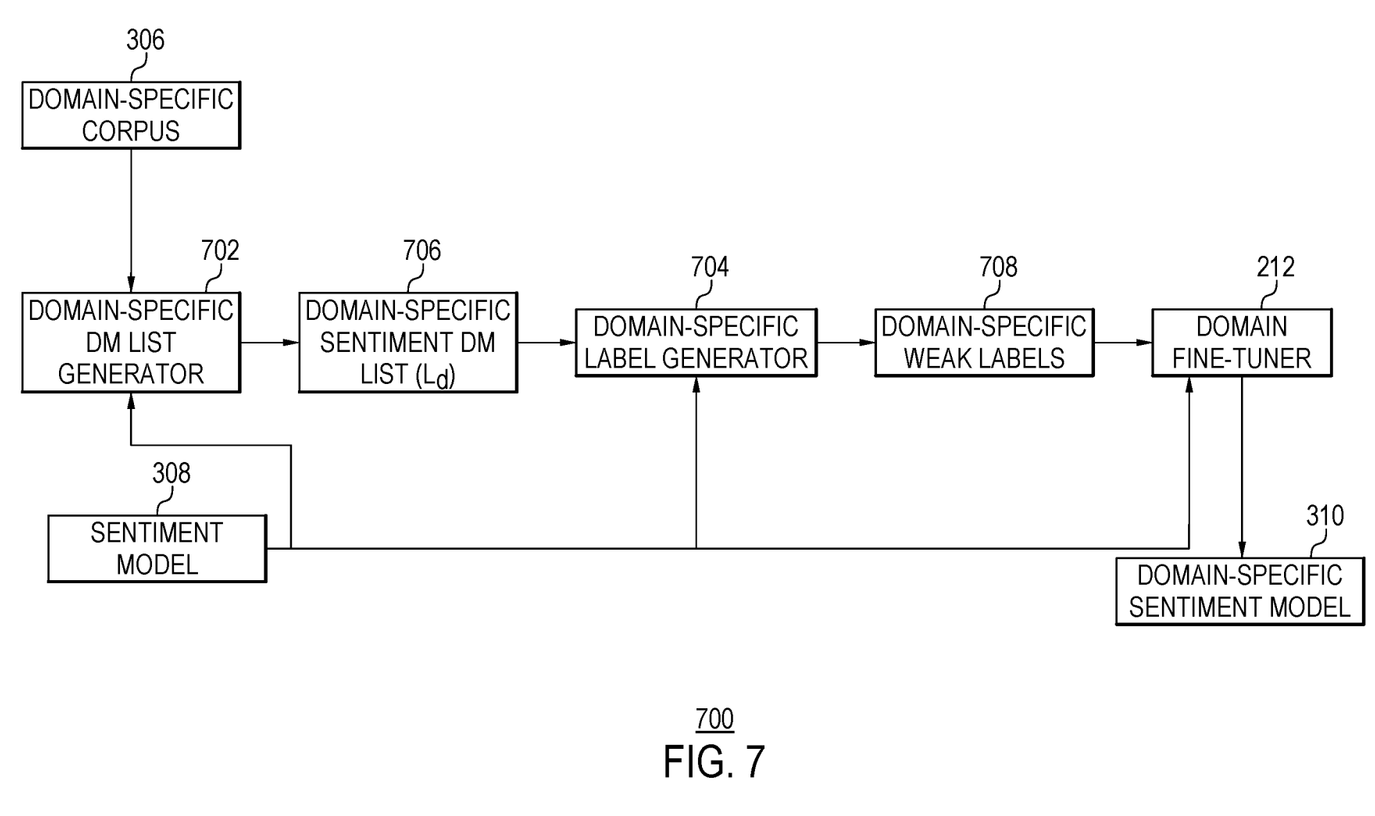
FIG. 7 is a block diagram of an example system for fine-tuning a sentiment model using domain-specific weak labels generated using discourse markers.

With reference now to FIG. 7, a block diagram shows an example system for fine-tuning a sentiment model using domain-specific weak labels generated using discourse markers. The example system is generally referred to by the reference number 700. FIG. 7 includes similarly referenced elements from FIGS. 2 and 3. In addition, the system 700 includes a domain-specific discourse marker (DM) list generator 702 communicatively coupled to a domain-specific label generator 704. The domain-specific label generator 704 is communicatively coupled to the domain fine-tuner 202. The domain-specific DM list generator 702 is shown generating a domain-specific sentiment DM list 706. The domain-specific label generator 704 is shown generating domain-specific weak labels 708.

In the example of FIG. 7, the system 700 can adapt a sentiment model 308, such as the SenDM model, to a new domain d to further improve its performance on that domain. For example, different domains may have different jargons, which may also be reflected in discourse markers of the different domains. Therefore, the system 700 can create a domain-specific sentiment DM list 706 and use the domain-specific sentiment DM list 706 to generate domain-specific weak labels 708, which can then be used to fine-tune the sentiment model 308 to generate a domain-specific sentiment model 310. For example, the robustness of SenDM model may emerge from the multi-domain corpus that the SenDM model is trained on, and the general nature of the sentiment DM list, Lg, composed of discourse markers that are abundantly used and carry a general sentiment signal. However, due to potential domain-specific jargon and language styles, given a domain-specific text corpus $C_d$, 306, a domain-specific sentiment model 310 may improve the performance on such domain.

Still referring to FIG. 7, given the domain specific corpus $C_d$ 306, the domain-specific DM list generator 702 can generate a domain-specific sentiment-related DM list $L_d$ 706. In various examples, the domain-specific DM list generator 702 can first identify a list of candidate discourse markers. For example, the domain-specific DM list generator 702 can select all the n-grams that open a sentence in the corpus followed by a comma. For example, the n-grams may include unigrams, bigrams, and trigrams. This set of n-grams is also denoted herein as prefixes P. For each n-gram in the set P, the domain-specific DM list generator 702 can sample from the domain-specific corpus x sentences that begin with P followed by a comma. In some examples, the domain-specific DM list generator 702 can further group the discourse marker candidates using name entity recognition (NER). For example, instead of multiple bigrams of the type "on Sept 9th", or "on Oct. 2, 2020", the domain-specific DM list generator 702 can generate one bigram "on DATE" and treat the previous multiple bigrams as instances of this one bigram. In some examples, the candidate list may be a list of the 1000 most frequent discourse markers. In various examples, specific filters may be further applied depending on the domain corpora. For example, in some domains, certain discourse markers may be very specific to a journal, or even a reporter. Therefore, in some examples, the domain-specific DM list generator 702 can further filter out discourse markers whose sentences originate from a relatively narrow set of journals. As one example, the domain-specific DM list generator 702 can define the entropy of a discourse marker, based on the probability distribution of its sentences across journals, and filter out 30% discourse markers with lowest entropy. Furthermore, in the case of the some domains, where the sentiment analysis task is to identify a sentiment with respect to a company, the domain-specific DM list generator 702 can apply above process only to sentences mentioning a company name. As one example, the domain-specific DM list generator 702 can use the list of all companies traded in one of the five major stock exchanges.

The domain-specific DM list generator 702 can then use the sentiment model 308 to select domain-specific discourse markers out of the candidate discourse marker list. For example, the domain-specific DM list generator 702 can run inference of sentiment model 308 on all the sampled sentences to obtain scored sentences. In various examples, the domain-specific DM list generator 702 can then use a statistical test to find the n-grams in P in which sampled sentences are enriched with confident predictions of m for one of the sentiment classes. For example, the statistical test used to find the n-grams may be the Hypergeometric test. These n-grams are selected for inclusion in the domain-specific sentiment discourse marker list $L_d$ 706. Thus, the domain-specific DM list generator 702 may not identify all domain specific sentiment related discourse markers. Rather, the domain-specific DM list generator 702 may generate a precision-oriented list of discourse markers, for the purpose of obtaining a high-quality weakly labeled set of sentences for inter-training process. Thus, the domain-specific DM list generator 702 performs a strict automatic filtering in the process. The idea is to first identify all n-grams that may potentially serve as discourse markers, and then identify whether the set of sentences they open is enriched with positive or negative sentiment, based on the predictions of the sentiment model 308, as described below.

As one example, the domain-specific DM list generator 702 can analyze the sentences that start with the discourse markers in the above candidate list, to find those discourse markers whose associated sentences are significantly associated with a highly confident prediction of positive or negative sentiments. For each candidate discourse marker, the domain-specific DM list generator 702 can sample 1000 sentences from the set of all sentences that start with the discourse marker followed by a comma, and assign each of these sentences with a sentiment if the sentence is scored with high confidence by the sentiment model 308. For each candidate discourse marker, the domain-specific DM list generator 702 can perform a statistical analysis of the sentiment of its associated sentences, on the sample of 1000 sentences, provided that they are not too repetitive based on token counts, and that the sentiment class with the higher count includes at least 85% of the sentences assigned a sentiment. In this example, a discourse marker may be considered to be associated with a positive or a negative sentiment if the p-value of the positive or the negative class is smaller than 0:01 after Bonferroni correction for multiple tests, based on a Hypergeometric test.

In various examples, the domain-specific label generator 704 can then generate domain-specific weak labels 708 based on the automatically generated domain-specific sentiment DM list 706. For example, the domain-specific label generator 704 can use sentences in the domain-specific corpus 306 that are opened with discourse markers from the domain-specific sentiment DM list 706 to create a domain-specific weakly-labeled dataset with domain-specific weak labels 708. For example, the domain-specific weak labels 708 may be generated similarly to the sentiment weak labels 604 as described in FIG. 6. In some examples, domain-specific weakly-labeled dataset can be further cleaned by selecting from the dataset only the confident predictions of m that are consistent with the weak label.

In various examples, the domain fine-tuner 212 can use the domain specific weakly labeled dataset to inter-train the sentiment model m to adapt the sentiment model m to the domain of interest d. Thus, the resulting domain-specific sentiment model 310 may perform better in the domain of interest d of the domain-specific corpus 306.

It is to be understood that the block diagram of FIG. 7 is not intended to indicate that the system 700 is to include all of the components shown in FIG. 7. Rather, the system 700 can include fewer or additional components not illustrated in FIG. 7 (e.g., additional client devices, or additional resource servers, etc.).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a list of sentiment carrying discourse markers;
   select sentences in a text corpus that begin with a discourse marker from the list of sentiment carrying discourse markers followed by a comma;
   remove each discourse marker and comma from a beginning of the selected sentences, and label each of the sentences with a sentiment associated with a corresponding removed discourse marker to generate a weakly labeled dataset;
   inter-train a pretrained language model using the generated weakly labeled dataset to generate a sentiment model; and
   identify whether a set of sentences is positive or negative sentiment, based on the sentiment model;
   wherein the processor is to replace entity names with entity types in prefixes of sentences from a domain-specific corpus to generate a list of domain-specific discourse marker candidates, and select a domain-specific list of positive and negative discourse markers based on domain-specific discourse marker candidates associated with randomly sampled sentences having higher and lower sentiment scores.

2. The system of claim 1, wherein the generated sentiment model comprises a general domain language model.

3. The system of claim 1, wherein the processor is to automatically generate a domain-specific list of discourse markers using the generated sentiment model.

4. The system of claim 1, wherein the processor is to extract sentences with domain-specific weak labels using an automatically generated domain-specific list of discourse markers.

5. The system of claim 1, wherein the processor is to extract sentences with domain-specific discourse markers and require that a prediction of the sentiment model for the extracted sentences after removing the with domain-specific discourse markers is consistent with a prediction of the class associated with the discourse markers with of the class associated with the discourse markers with scores exceeding a threshold, and use the extracted sentences without the prefixes as weakly labeled domain-specific training data, where the weak labels are the classes associated with the discourse markers.

6. The system of claim 1, wherein the processor is to fine-tune the generated sentiment model to generate a domain-specific sentiment model based on an weakly labeled domain-specific training data automatically generated using the sentiment model from a domain-specific corpus.

7. A computer-implemented method, comprising:
   receiving, via a processor, a list of sentiment carrying discourse markers;
   selecting, via the processor, sentences in a text corpus that begin with a discourse marker from the list of sentiment carrying discourse markers followed by a comma;
   removing, via the processor, each discourse marker and comma from a beginning of the selected sentences and labeling each of the sentences with a sentiment associated with to a corresponding removed discourse marker to generate a weakly labeled dataset;
   inter-training, via the processor, a pretrained language model using the generated weakly labeled dataset to generate a sentiment model; and
   identifying whether a set of sentences is positive or negative sentiment, based on the sentiment model;
   wherein the processor is to replace entity names with entity types in prefixes of sentences from a domain-specific corpus to generate a list of domain-specific discourse marker candidates, and select a domain-specific list of positive and negative discourse markers based on domain-specific discourse marker candidates associated with randomly sampled sentences having higher and lower sentiment scores.

8. The computer-implemented method of claim 7, comprising automatically generating, via the processor, a domain-specific list of discourse markers using a domain-specific corpus and the sentiment model.

9. The computer-implemented method of claim 8, wherein the automatically generating the domain-specific list of discourse markers comprises extracting sentence-opening n-grams followed by a comma from the domain-specific corpus.

10. The computer-implemented method of claim 8, wherein the automatically generating the domain-specific list of discourse markers comprises grouping together discourse marker candidates using named entity recognition (NER).

11. The computer-implemented method of claim 8, wherein the automatically generating the domain-specific list of discourse markers comprises randomly sampling sentences associated with a set of most frequently detected discourse marker candidates in the domain-specific corpus and running inference on the sentiment model for sentences without discourse marker prefixes to identify discourse markers associated with overrepresentation of confident predictions of the sentiment model in any of a plurality of sentiment classes.

12. The computer-implemented method of claim 7, comprising generating, via the processor, domain-specific weakly labeled training data using an automatically generated list of domain-specific discourse markers.

13. The computer-implemented method of claim 12, comprising fine-tuning, via the processor, the sentiment model using the generated domain-specific weakly labeled training data to generate a domain-specific sentiment model.

14. A computer program product for generating sentiment models, the computer program product comprising a computer-readable storage medium having program code embodied therewith, the program code executable by a processor to cause the processor to:
   receive a list of sentiment carrying discourse markers;
   select sentences in a text corpus that begin with a discourse marker from the list of sentiment carrying discourse markers followed by a comma;
   remove each discourse marker and comma from a beginning of the selected sentences and labeling each of the sentences with a sentiment associated with to a corresponding removed discourse marker to generate a weakly labeled data;
   inter-train a pretrained language model using the generated weakly labeled data to generate a sentiment model; and
   identify whether a set of sentences is positive or negative sentiment, based on the sentiment model;
   wherein the processor is to replace entity names with entity types in prefixes of sentences from a domain-specific corpus to generate a list of domain-specific discourse marker candidates, and select a domain-specific list of positive and negative discourse markers based on domain-specific discourse marker candidates associated with randomly sampled sentences having higher and lower sentiment scores.

15. The computer program product of claim 14, further comprising program code executable by the processor to automatically generate a domain-specific list of discourse markers using a domain-specific corpus and the sentiment model.

16. The computer program product of claim 15, further comprising program code executable by the processor to extract sentence-opening n-grams followed by a comma from the domain-specific corpus.

17. The computer program product of claim 15, further comprising program code executable by the processor to group together discourse marker candidates using named entity recognition (NER).

18. The computer program product of claim 14, further comprising program code executable by the processor to randomly sample sentences associated with a set of most frequently detected discourse marker candidates in the domain-specific corpus and running inference on the sentiment model for sentences without discourse marker prefixes to identify discourse markers associated with overrepresentation of confident predictions of the sentiment model in any of a plurality of sentiment classes.

19. The computer program product of claim 14, further comprising program code executable by the processor to generate a domain-specific weakly labeled training dataset based on an automatically generated list of domain-specific discourse markers and fine-tune the sentiment model based on the domain-specific weakly labeled training dataset.

* * * * *